F. A. HAINES.
PROCESS OF PASTEURIZATION.
APPLICATION FILED DEC. 4, 1915.
1,196,357.
Patented Aug. 29, 1916.
3 SHEETS—SHEET 2.
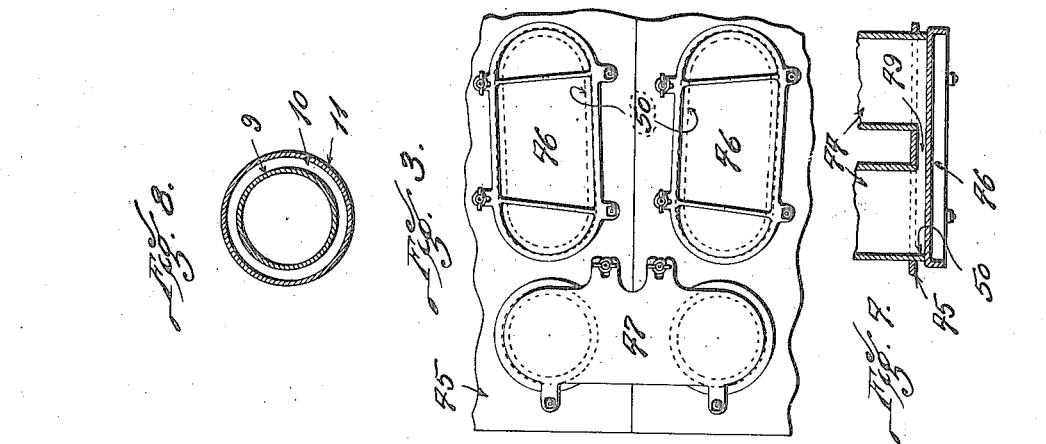
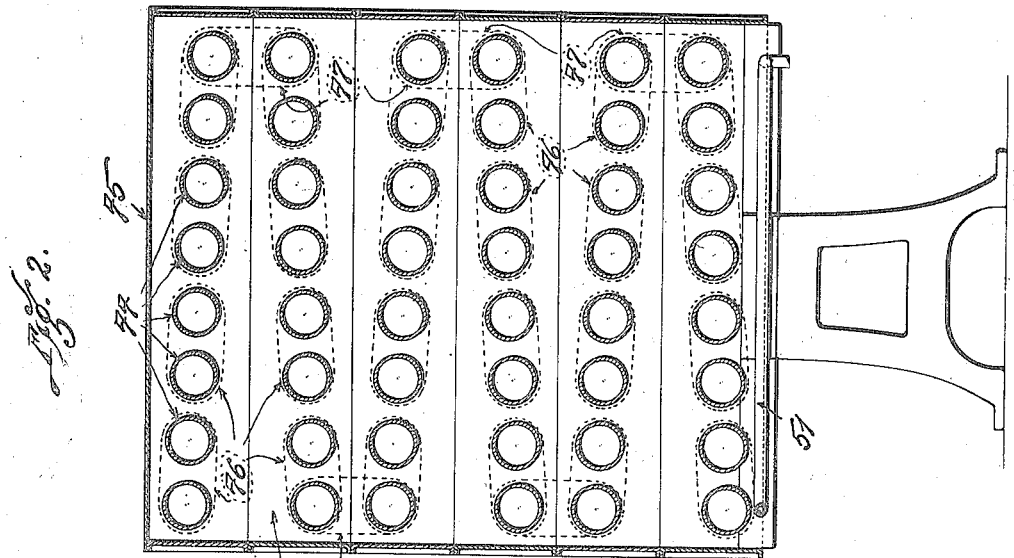
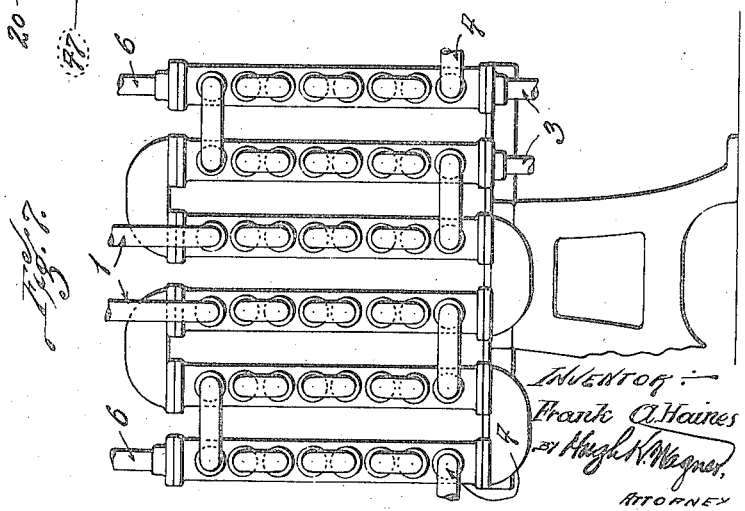
INVENTOR:
Frank A. Haines
BY Hugh K. Wagner
ATTORNEY

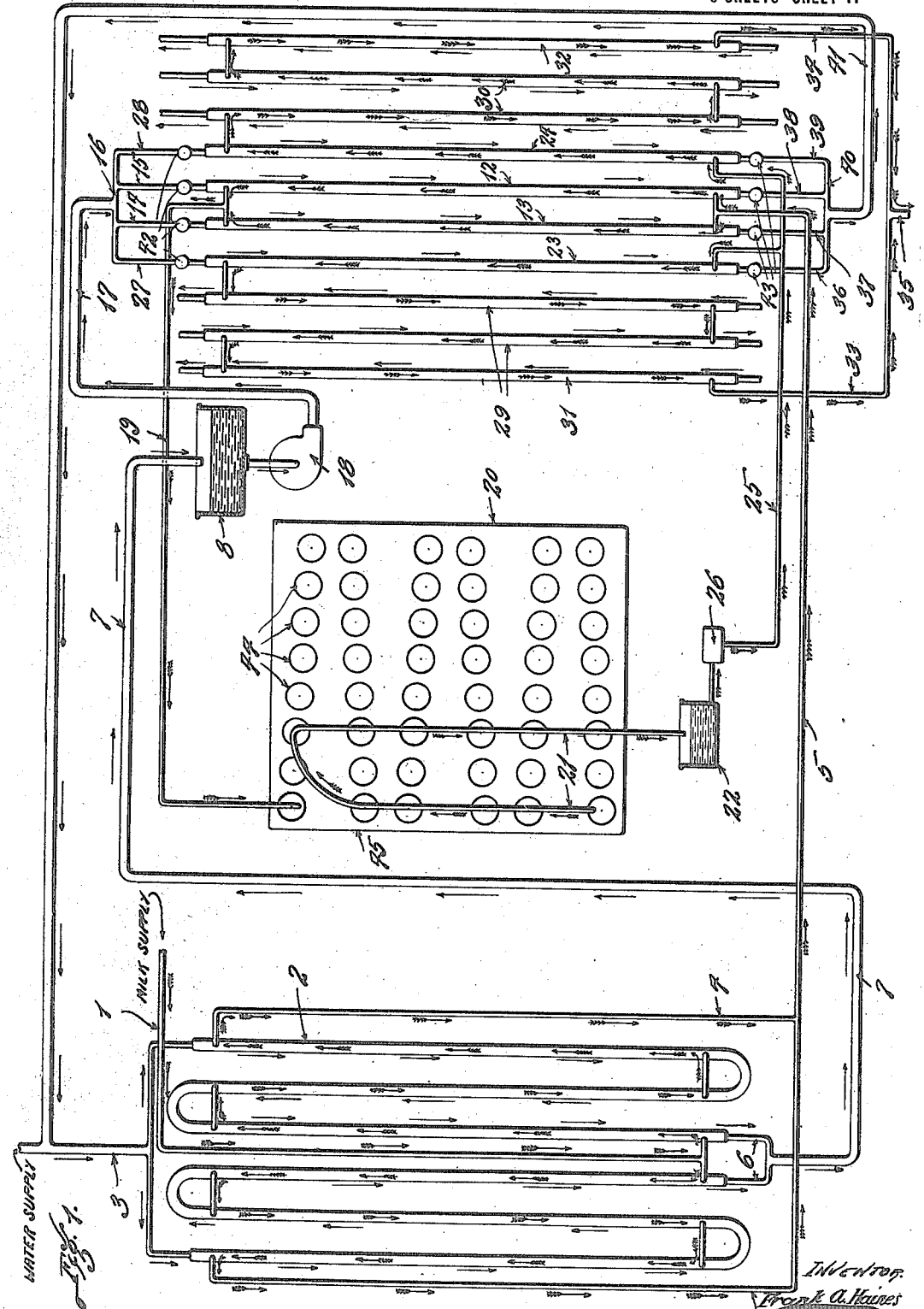

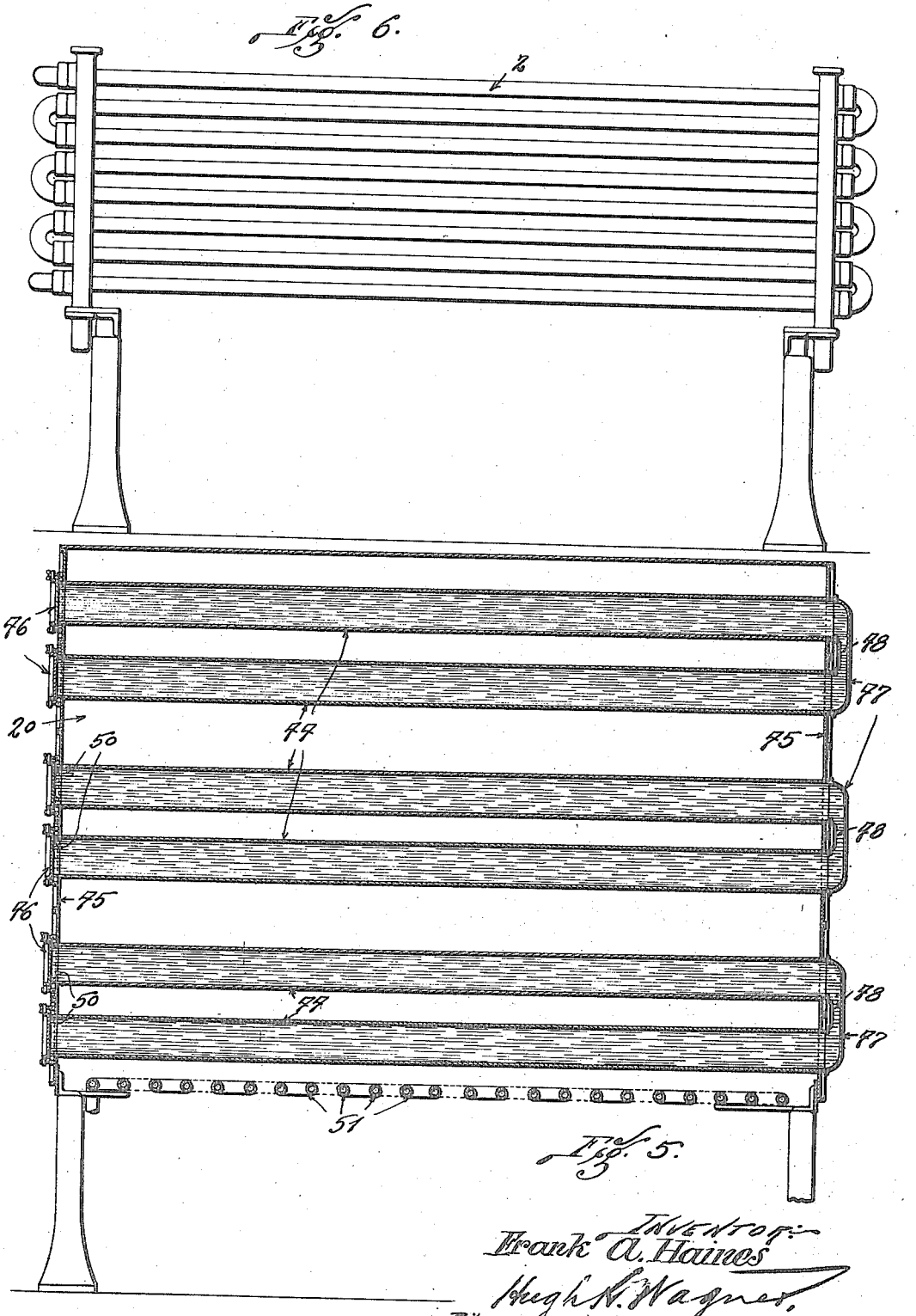

UNITED STATES PATENT OFFICE.

FRANK A. HAINES, OF ST. LOUIS, MISSOURI, ASSIGNOR OF ONE-HALF TO DANIEL C. KERCKHOFF, OF ST. LOUIS, MISSOURI.

PROCESS OF PASTEURIZATION.

1,196,357.   Specification of Letters Patent.   Patented Aug. 29, 1916.

Application filed December 4, 1915. Serial No. 64,953.

*To all whom it may concern:*

Be it known that I, FRANK A. HAINES, a citizen of the United States, residing at the city of St. Louis, in the State of Missouri, have invented certain new and useful Improvements in Processes of Pasteurization, of which the following is a specification.

This invention relates to a method of pasteurizing milk or other liquids, and has for its object to provide a method of the character stated which may be practised conveniently and economically and whereby substantially all of the injurious bacteria in a liquid, such, for instance, as milk, treated thereby will be destroyed and rendered harmless without materially altering said liquid chemically, without destroying the cream line of milk, and without otherwise unfavorably affecting the usual properties of said liquid, with the result that the keeping of said liquid sweet and palatable for a relatively long time is greatly facilitated.

Heretofore milk has been pasteurized in the trade in handling large quantities by either of two processes. One, known as the "flash" process, consists of subjecting the milk to a relatively high temperature for a very short period of time, say thirty to sixty seconds, and the other process, known as the "holding" process, consists in subjecting the milk to a relatively lower temperature and holding it at that temperature for a relatively long period of time, say approximately thirty minutes. Each of these processes has disadvantages in practical application, and frequently fails to achieve the desired result. In the use of the "flash" process it may occur that in destroying the injurious bacteria the degree of heat to which the milk is exposed may be so great that the pasteurized milk will have a cooked taste that is unpalatable and, also, that the cream line will be destroyed, thus rendering the product not readily salable in the market, or the heat for pasteurization may fail to reach every part of the entire bulk of milk attempted to be pasteurized by this process, and thus the bacteria will not be destroyed and the product will still be injurious to the health of the user or may be subject to deterioration by reason of said bacteria being left alive. In the use of the "holding" process it may occur that the degree of heat to which the milk is exposed is so low that a sufficient number of the bacteria may survive the treatment that by multiplying will very quickly cause the product to sour or to become otherwise unfit for the ordinary use of the consumer at or shortly after it is delivered to him or the prolongation of the time of treatment may result in chemical changes in the milk.

An advantage of the present invention is that the method of pasteurization embodied therein may be employed in plants using either of the other methods hereinabove referred to by means of the installation of relatively inexpensive additional equipment whereby the method of this invention may be practised to produce a substantially perfectly pasteurized milk which will keep sweet and palatable for a relatively long time, in which the cream line has not been destroyed, and which is otherwise suitable for the use of the consumer.

Samples of milk equally contaminated analyzed after being treated by the "flash" process have been found to contain from twenty thousand to one hundred and forty thousand bacteria to the cubic centimeter; samples of milk analyzed after being treated by the "holding" process have been found to contain from twenty thousand to thirty-five thousand bacteria of an injurious nature to the cubic centimeter; whereas samples of milk pasteurized by the method embodying the present invention are shown upon analysis to contain less than one thousand bacteria to the cubic centimeter.

The method of the present invention comprises substantially three distinct steps, which may be successively performed in a continuous process and which consist, first, in subjecting the milk to a relatively high degree of heat for a relatively very short period of time; second, subjecting the same milk to a relatively lower degree of heat for a relatively long period of time; and, third, cooling the milk to a temperature suitable for marketing the same, the method providing that all of the milk under treatment will be subjected for a sufficient length of time to pasteurizing heat to destroy substantially all of the injurious bacteria contained therein in a manner adapted for convenient use in practical operation.

In the accompanying drawings forming part of this specification, in which like numbers of reference denote like parts wherever they occur, Figure 1 is a diagrammatical view illustrating one form of apparatus for practical application of the method of pasteurization according to the present invention; Fig. 2 is a vertical sectional view on an enlarged scale of the holder shown in plan elevation in the central part of Fig. 1, in which holder the milk or other liquid is subjected to a relatively lower pasteurizing temperature for a relatively long period of time; Fig. 3 is a fragmentary plan view on an enlarged scale showing the two different kinds of end doors whereby in one case the milk in the holder flows, for instance, from the tube in the upper left-hand corner of Fig. 2 to the next adjacent tube thereto in the same row and whereby in the other case the milk in the holder flows, for instance, from the tube at the right-hand end of the top row of tubes in Fig. 2 to the right-hand end tube in the next lower row of tubes; Fig. 4 is a sectional view, in fragment, of one of the doors shown in Fig. 3; Fig. 5 is a vertical sectional view on an enlarged scale of the holder shown in the central part of Fig. 1, said sectional view being substantially at a right angle to the sectional view shown in Fig. 2; Fig. 6 is a side elevation on an enlarged scale of the coil of tubes shown on the left-hand and right-hand side portions of Fig. 1, in which coils on the left-hand side the milk is subjected to a relatively high temperature for a relatively very short time and then delivered through coils on the right-hand side to be cooled to pass thence into the holder in the central portion of Fig. 1 and thence to be delivered to other of the coils on said right-hand side of said figure for final cooling; Fig. 7 is an end elevation of Fig. 6; and Fig. 8 is a cross section on an enlarged scale of one of the tubes shown in the coils of Figs. 6 and 7 and on the right-hand and left-hand side portions of Fig. 1.

By way of convenient illustration, Fig. 1 shows, diagrammatically, a suitable manner of applying the method embodying the present invention to the pasteurization of milk in a substantially continuous process. Pipe 1 or the like may be provided adapted for conveying unpasteurized milk from a supply tank or the like (not shown) to heating coils 2, at the left-hand side of said Fig. 1, wherein the milk is gradually raised to a relatively high pasteurizing temperature, such, for instance, as a temperature of about one hundred sixty degrees Fahrenheit, near which temperature the milk remains for a period of from about thirty to about sixty seconds prior to its discharge from the heating coil. Water heated to a sufficient degree and introduced into said coils through supply pipe 3 or the like may be provided as the means of heating the milk in said coils to the required relatively high pasteurizing temperature, the milk being adapted to circulate through said coils in one direction and the water being adapted to circulate through said coils in the opposite direction, as diagrammatically shown in said Fig. 1, wherein the feathered arrows illustrate the direction of the circulation of the milk from milk supply pipe 1 through said coils to milk discharge pipes 4, which discharge pipes connect with the common conveyer pipe 5 for the milk, and wherein the unfeathered arrows illustrate the direction of the circulation of the heated water from water supply pipe 3 through said coils to water discharge pipes 6, which discharge pipes are connected with common water discharge pipe 7, the latter being adapted to convey the water discharged from said coils to tank 8 or the like. A stand of said coils 2 is shown in side elevation in Fig. 6 and in end elevation in Fig. 7, said coils forming said stand being of a well-known construction and comprising a plurality of jacketed tubes, such, for instance, as the jacketed tube shown in cross-section in Fig. 8, wherein an inner tube 9 is adapted to convey the milk in its course through said coils and wherein the space 10, between the outside of said tube 9 and the inner walls of a larger tube 11 adapted to cover said tube, is adapted to convey said water as a water-jacket around tube 9 in the course of the water circulation of said coils.

The temperature at which the heated water enters coil 2 through pipe 3 is adapted to the temperature at which the milk enters said coils through pipe 1 and, also, to weather conditions. In practice it has been found that, under normal conditions in a building in which the work of applying the method of this invention may be practised, when the milk is conveyed to coils 1 at a temperature of about forty degrees Fahrenheit, water heated to a temperature of about one hundred eighty-five degrees Fahrenheit and introduced into said coils at said temperature will gradually heat said milk to the required pasteurizing temperature of about one hundred sixty degrees Fahrenheit, the construction and arrangement of said coils being such that the milk will have been at a temperature of not much lower than one hundred sixty degrees Fahrenheit for about thirty to sixty seconds prior to its discharge through pipes 4 into the common conveyer pipe 5 at about that temperature, and the heated water circulating through said coils and performing its work of raising the milk to said pasteurizing temperature will be discharged through pipes 6 into common water discharge pipe 7 and thence to tank 8 at a reduced temperature of substantially about sixty degrees Fahrenheit. The milk is conveyed by means of said conveyer pipe 5 from heating coils 2 to primary cooling coils 12, 13 (Fig. 1), which cooling coils comprise adjoining and connected stands of a plurality of jacketed tubes similar to the tube shown in cross-section in Fig. 8 and hereinabove described, the cooling element for the milk conveyed to said coils being provided by causing the cooled water discharged from pipe 7 into tank 8 to circulate through said coils 12, 13, said water being introduced into said coils through branches 14, 15 of multiple 16, said multiple being connected with feed pipe 17 through which water from tank 8 is pumped to said multiple by means of rotary pump 18 or the like, said water, which enters said coils 12, 13 at substantially a temperature of sixty degrees Fahrenheit being caused to circulate through said coils in one direction, indicated by the unfeathered arrows, while the milk, which enters said coils at substantially a temperature of about one hundred sixty degrees Fahrenheit, is caused to circulate through said coils in the opposite direction, indicated by the feathered arrows. Said milk, when discharged from coils 12, 13 to holder feed pipe will have been cooled to a temperature of about one hundred forty-three degrees Fahrenheit, at which reduced temperature it is delivered to holder 20 wherein it is held at substantially said temperature of about one hundred forty-three degrees Fahrenheit for a period of from about twenty to thirty minutes and is then discharged from said holder through pipe 21 or the like to tank 22 or the like, from which tank the milk may be delivered to cooling coils 23, 24 through pipe 25 by any suitable means, such, for instance, as by means of being forced through said pipe by means of pump 26 or the like.

The cooling coils 23, 24 are composed of stands of a plurality of jacketed tubes such as the tube hereinbefore described and shown in cross-section in Fig. 8. The milk circulates through coils 23, 24 in one direction, as illustrated by the feathered arrows in Fig. 1, and cooled water delivered from tank 8 through pipe 17, multiple 16, and branches 27, 28 of said multiple circulates through said coils 23, 24 in the opposite direction, as illustrated by the unfeathered arrows, said milk being caused to pass from said coils 23, 24 to coils 29, 30, said coils being, also, stands composed of a multiple of jacketed tubes similar to the jacketed tube shown in cross section in said Fig. 8, said milk circulating through said coils 29, 30 in one direction, as indicated by feathered arrows in Fig. 1, and cold water from the water cooling tower or the like (not shown) delivered to said coils in any suitable manner circulates through said coils 29, 30 in the opposite direction, as indicated by unfeathered arrows in said Fig. 1, said water delivered from said cooling tower or the like being discharged from said coils 29, 30 in any suitable manner after circulating therethrough. Two double sets of brine coils 31 and 32 may be provided, said sets of coils each comprising a multiple of jacketed tubes similar to the tube shown in cross-section in said Fig. 8 and hereinabove described, set 31 being operatively connected with cooling coils 29 and set 32 being operatively connected with cooling coils 30, as shown in Fig. 1, so that milk from coils 29 may pass therefrom into the set of brine coils 31 and milk from coils 30 may pass to the set of brine coils 32, said milk being caused to circulate through said sets of brine coils in one direction as indicated by feathered arrows in Fig. 1 and brine being caused to circulate through said sets of brine coils in the opposite direction as indicated by unfeathered arrows in said Fig. 1, the milk, after circulating through said brine coils being discharged therefrom through exit pipes 33 and 34, respectively, to the common discharge pipe 35, from whence it is discharged to a bottling machine, storage station, refrigerator, or the like (not shown) at a temperature suitable for preparation for distribution to the consumers, which temperature may, in practice, be about forty degrees Fahrenheit.

The cooled water delivered from tank 8 through pipe 17, multiple 16, and the branches 14, 15, 27, and 28 of said multiple to coils 12, 13 and to coils 23, 24 may enter said coils, in practice, at about a temperature of sixty degrees Fahrenheit, which is the temperature to which it will have been reduced after having passed through coils 2, as hereinabove stated, and will be discharged from said coils 12, 13 and 23, 24 through branches 36, 37, 38, and 39 of multiple 40 to the common pipe 41 connected with said multiple at an increased temperature of about one hundred degrees Fahrenheit, at which temperature it may be conducted through said pipe 41 back to pipe 3 where by means of injected steam or otherwise it may again be heated to the higher temperature of about one hundred eighty-five degrees Fahrenheit, or such other temperature as may be necessary under a given condition to produce the heat required to raise milk introduced into said coils 2 with a jacket of said water to the required pasteurizing temperature of about one hundred sixty degrees Fahrenheit in the first step of the method embodying this invention and hereinabove described. The heating of the water circulated through coils 12, 13 is caused by the cooling of the milk circulated through said coils, which milk is, as before stated, introduced into said coils at a temperature of about one hundred sixty degrees Fahrenheit and is discharged therefrom to holder 20 at about a pasteurizing temperature of one hundred forty-three degrees Fahrenheit, and the heating of the water circulated through coils 23, 24 is caused by the cooling of the milk delivered to said coils 23, 24 at about a temperature of one hundred forty-three degrees from said holder, the result being that the temperature of the water in the common pipe 41 into which it flows after being discharged from said coils 12, 13, and 23, 24 will be about one hundred degrees Fahrenheit, as above stated, or very much warmer than water supplied from the usual source of water supply and, therefore, much saving in fuel is accomplished as it will require relatively much less heat to raise the temperature of said coil water from the said one hundred degrees to the required temperature of about one hundred eighty-five degrees to use same in the first step of this process than it would require to heat water from the relatively very low temperature at which it is supplied from the ordinary source of supply to said one hundred eighty-five degrees. Valves 42 or the like may be provided to control the entrance of the cooled water to coils 12, 13, 23, and 24, and valves 43 or the like may be provided to control the discharge of the water from said coils after it has circulated therethrough.

Besides saving fuel this arrangement provides for a saving in water, for the water that is raised to a relatively high temperature and is circulated through coils 2 in the first step of this pasteurizing process is cooled in said step sufficiently so that a part thereof is used to serve as a cooling element in coils 12, 13 in the second step of the process and another part thereof is used to serve as a cooling element in the initial step of the final cooling process which occurs in coils 23, 24, and then the reheated water discharged from said coils 12, 13 and 23, 24 is brought back to pipe 3 and further reheated to be again used in the various steps of the method embodying the present invention, as hereinabove described.

As stated above the initial step of the final cooling of the milk is performed in coils 23, 24 by means of the cooled water delivered to said coils from tank 8, the second step of said final cooling being performed in coils 29, 30 by means of relatively cold water delivered to said coils from the cooling tower or the like, and the final step of said cooling process being performed in brine coils 31 and 32 by means of brine caused to circulate through said coils.

Holder 20 may be of any well-known construction, such, for instance, as that shown in the drawings, and may consist of a stand of a series of successively connected tubes 44 inclosed in a casing 45, said tubes being so arranged that milk fed into the uppermost tube in the series through pipe 19 will flow by gravity through all the tubes of the series successively and emerge from the lowermost tube through discharge pipe 21 in the period of from about twenty to about thirty minutes. To facilitate the cleansing of said tubes they are open at both ends and to connect said tubes serially channel-bearing doors 46 and 47 are provided, the channel 48 (Fig. 5) of doors 47 being adapted to connect an end of the end-tube of one row with the adjacent end of an end-tube of the next lower row and the channel 49 (Fig. 4) in doors 46 being adapted to connect an end of one tube with the adjacent end of the tube next thereto laterally, said channel 49 between a lateral flange 50 (Fig. 4) connecting adjacent side portions of the ends of said two tubes and the inner wall of said door 46, as clearly shown in Fig. 4. If desired means may be provided for heating said holder, such, for instance, as steam coils or pipes 51 (Fig. 5) or the like to insure maintaining the milk flowing through the tubes of said holder at the required pasteurizing temperature of about one hundred forty-three degrees during the time that said milk is in said holder.

A great advantage of the method embodying the present invention is that it provides for a substantially perfect pasteurization of milk or other liquids in a manner suitable for economical commercial practice and results in a product that is readily marketable and is adapted for all uses to which said product is ordinarily put.

An advantage of causing the cold milk introduced into coils 2 to circulate through said coils in a direction opposite to the direction of the circulation of the hot water introduced into said coils is that the milk circulates toward the more highly heated water and is, therefore, more quickly, more uniformly, and more economically heated to the relatively high pasteurizing temperature required and, moreover, the water discharged from said coils will be reduced to a lower temperature than would otherwise be the case.

An advantage in causing the milk in the cooling coils 12, 13, 23, 24, 29, 30, 31, and 32 to circulate in said coils in a direction opposite to the circulation of the cooling elements in said coils is that the milk is more quickly, more uniformly, and more economically cooled thus than would otherwise be the case, and, moreover, in the case of the water discharged from coils 12, 13, 23, and 24 being again reused, said water is discharged at a higher temperature than would otherwise be the case, and same may, therefore, be more economically reheated to the required relatively high temperature adapted for its reuse in the initial part of the method of this invention.

A great advantage of first raising the milk to a relatively high pasteurizing temperature and holding it at said temperature for a relatively very short period of time and then reducing its temperature to a lower pasteurizing temperature and holding it for a relatively longer period of time at said lower temperature is that in case all the bacteria have not been destroyed by the initial heating, those remaining will be practically all destroyed in the holding stage of the method, and this is the result achieved in practice with the method of this invention.

The exact temperatures and periods of time and the manner of practising this method stated herein may be varied without departing from the nature and spirit of the present invention, and will necessarily be changed when this process is applied to beer, wine, vinegar, or other liquids to be pasteurized, such changes being made to correspond to the understood character of each liquid, different times and temperatures being applied to each liquid according to its known characteristics.

I claim:

1. The herein described method of pasteurizing milk and the like, which consists in introducing the milk at a temperature of substantially forty degrees Fahrenheit in a coil heated to a temperature of appproximately one hundred eighty five degrees Fahrenheit and flowing the milk through said coil whereby the milk is raised to a temerature of about one hundred sixty degrees Fahrenheit, then flowing the milk to a primary cooler and rapidly reducing its temperature to a relatively lower pasteurizing temperature and holding it at such relatively lower temperature for a relatively long time and then further cooling the milk.

2. The herein described method of pasteurizing milk, which consists in gradually raising the temperature of the liquid to a temperature of about one hundred and fifty-five to one hundred and sixty-five degrees Fahrenheit at which temperature or not much below the milk will have been for about thirty to sixty seconds prior to its discharge to a primary cooler, then flowing the liquid to a primary cooler and rapidly reducing its temperature to about one hundred thirty eight to one hundred forty three degrees Fahrenheit, holding the liquid at said reduced temperature for approximately twenty to thirty minutes, and then further cooling the liquid.

In testimony whereof I hereunto affix my signature.

FRANK A. HAINES.